Figure 1:
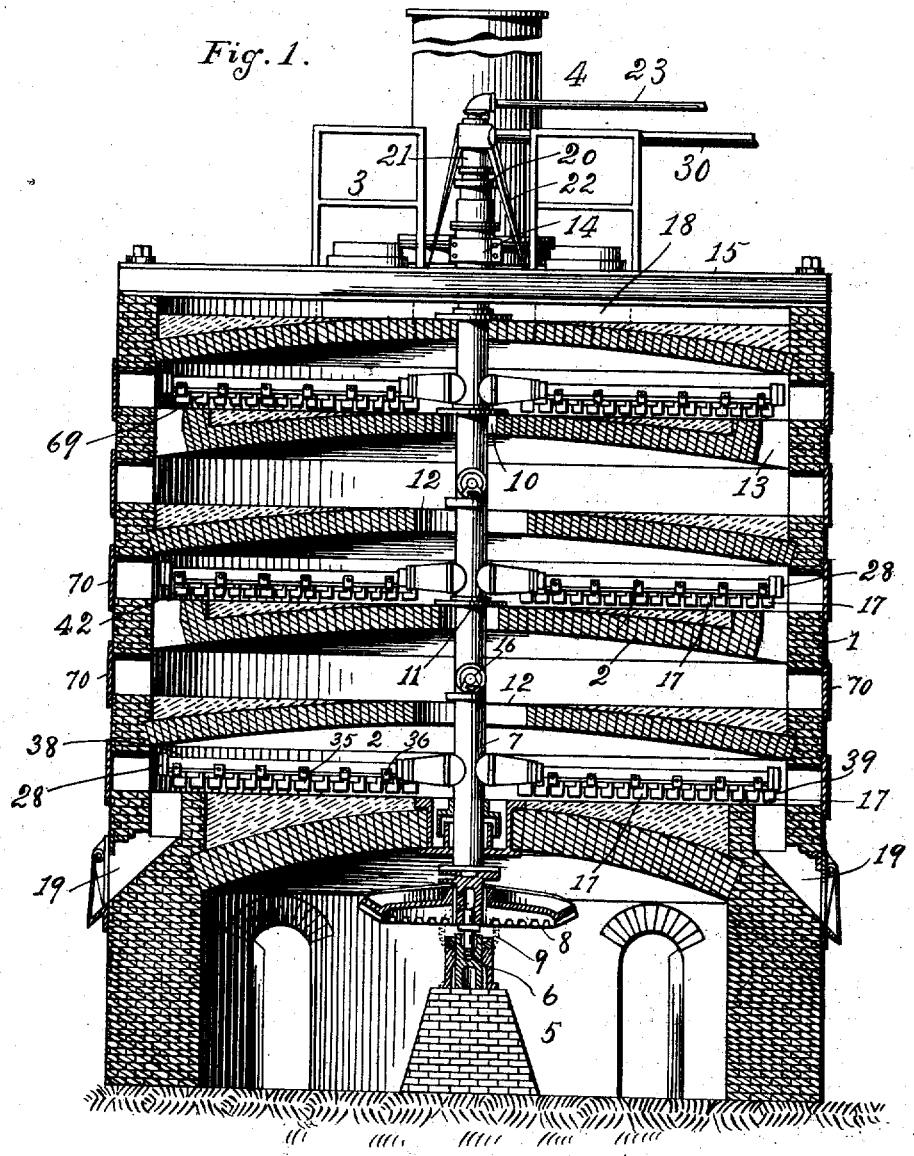

No. 11,932. Reissued Sept. 17, 1901.

L. T. WRIGHT.

ROASTING FURNACE.

(Application filed July 22, 1901.)

3 Sheets—Sheet 1.

WITNESSES:

K. Lockwood Nevins

M. T. Begley.

INVENTOR.

Lewis T. Wright.

BY

Francis M. Wright

ATTORNEY.

No. 11,932. Reissued Sept. 17, 1901.

L. T. WRIGHT.

ROASTING FURNACE.

(Application filed July 22, 1901.)

3 Sheets—Sheet 2.

WITNESSES:

K. Lockwood Nevins

M. T. Begley.

INVENTOR.

Louis T. Wright

BY

Francis M. Wright

ATTORNEY.

No. 11,932. Reissued Sept. 17, 1901.
L. T. WRIGHT.
ROASTING FURNACE.
(Application filed July 22, 1901.)
3 Sheets—Sheet 3.
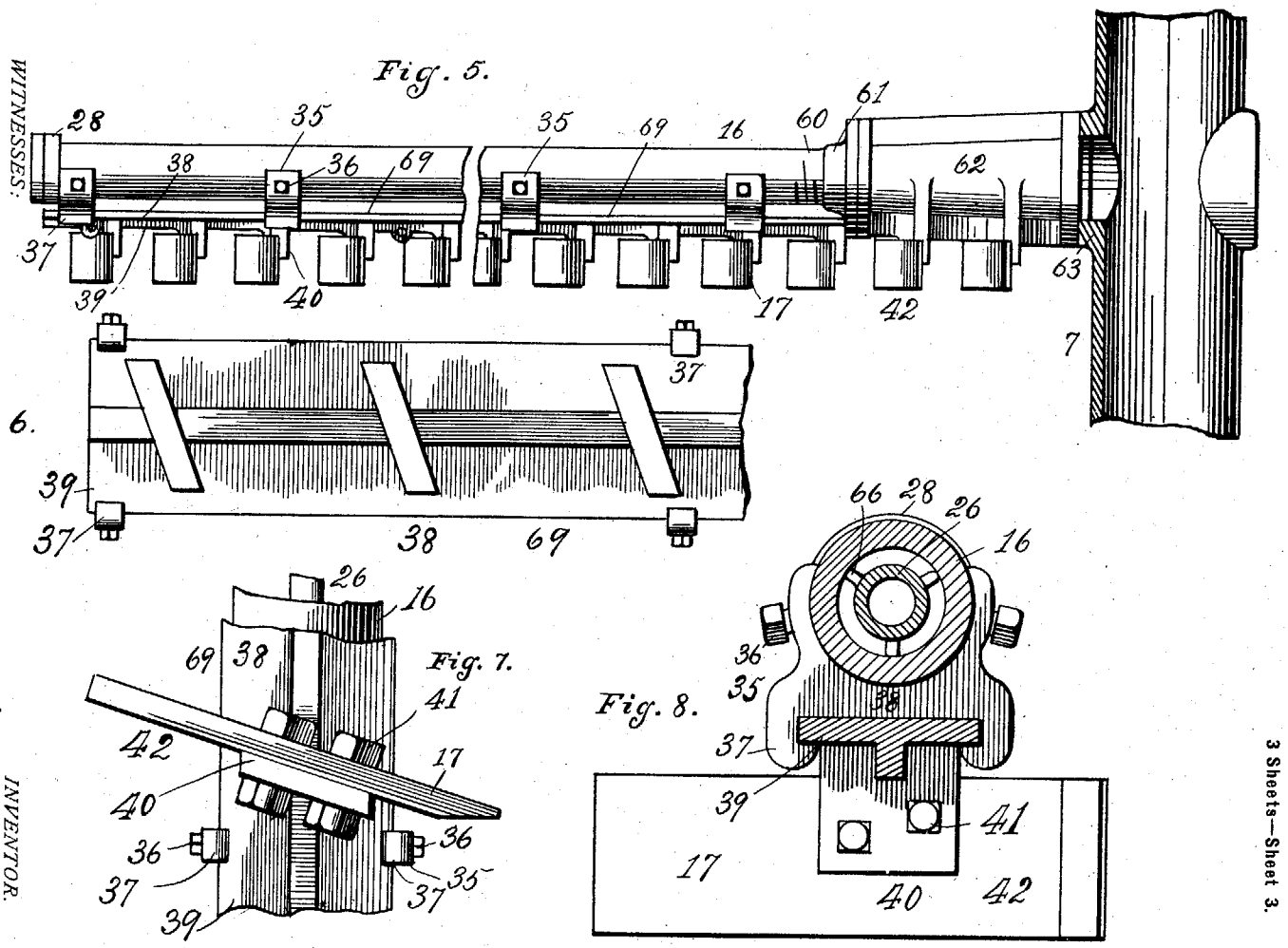
WITNESSES:
K. Lockwood Nevins.
M. T. Begley.
INVENTOR.
Lewis T. Wright
BY
Francis M. Wright
ATTORNEY.

UNITED STATES PATENT OFFICE.

LEWIS T. WRIGHT, OF KESWICK, CALIFORNIA.

ROASTING-FURNACE.

SPECIFICATION forming part of Reissued Letters Patent No. 11,932, dated September 17, 1901.

Original No. 629,033, dated July 18, 1899. Application for reissue filed July 22, 1901. Serial No. 69,343.

*To all whom it may concern:*

Be it known that I, LEWIS T. WRIGHT, a subject of the King of Great Britain, residing at Keswick, in the county of Shasta and State of California, have invented certain new and useful Improvements in Roasting-Furnaces, of which the following is a specification.

My invention relates to improvements in roasting-furnaces, the object of my invention being to provide an improved rotary stirrer for use in such furnaces.

My invention is more particularly applicable to what is known as the "McDougall roasting-furnace," and I shall describe it as applied thereto, it being understood that I do not limit the application of my invention to any one form of furnace.

The McDougall furnace contains a vertical series of floors of brick having discharge-openings in each floor to the floor next below alternately at the circumference and at the center. A central shaft is provided having arms extending over these floors, said arms carrying rabbles, and the rabbles on the series of arms are alternately inclined, so as to gradually work the ore that is being roasted first outward to the circumference, where it is discharged through an opening onto the floor below, then from the circumference to the center, where it is discharged through a central opening onto the next floor, and so on, being finally discharged from the lowest floor at the circumference. At the same time the air necessary for combustion of the ore passes upward in the reverse direction to the downward movement of the ore.

Now the heat required in roasting certain ores is such that the central shaft, the arms, and the rabbles thereon have but a short lifetime and are always in danger of being disabled by momentary excess of heat; and the object of my invention has been to provide means for cooling these parts, so as to give them greater durability and to enable the temperature of the furnace to be increased, if desired, considerably above such a temperature as would, if employed with uncooled arms, rapidly result in their destruction.

My invention also resides in the novel construction, combination, and arrangement of parts hereinafter fully specified, and particularly pointed out in the claims.

Figure 2:
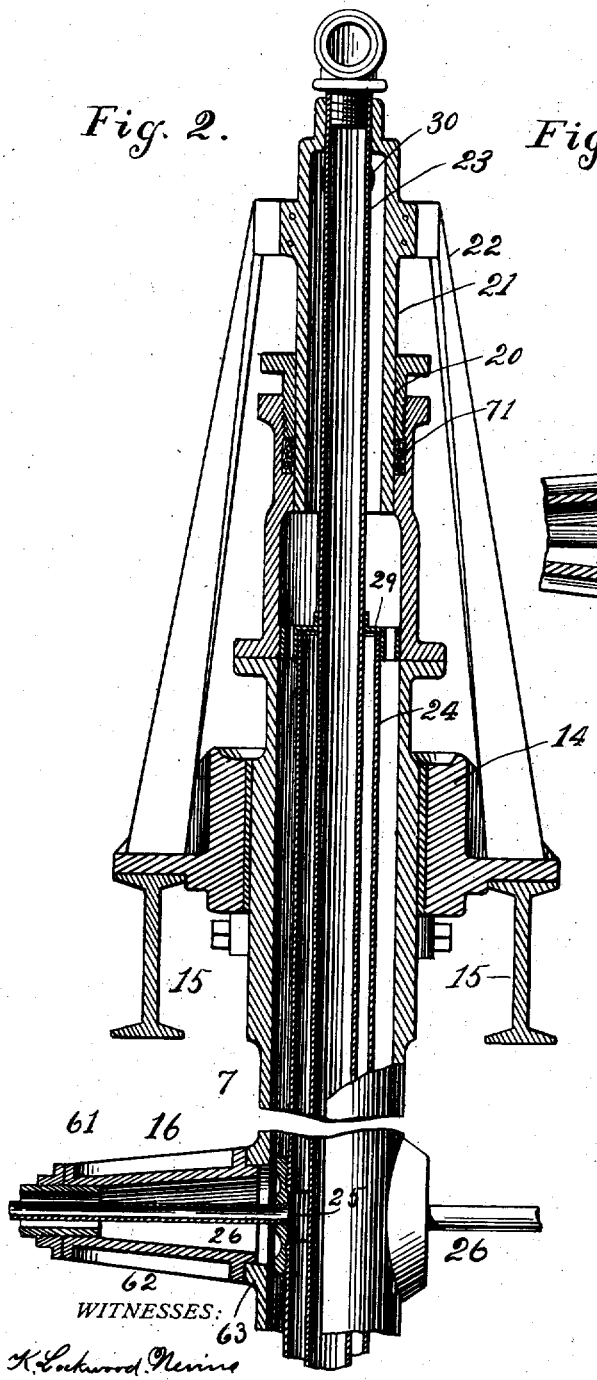
Figure 3:
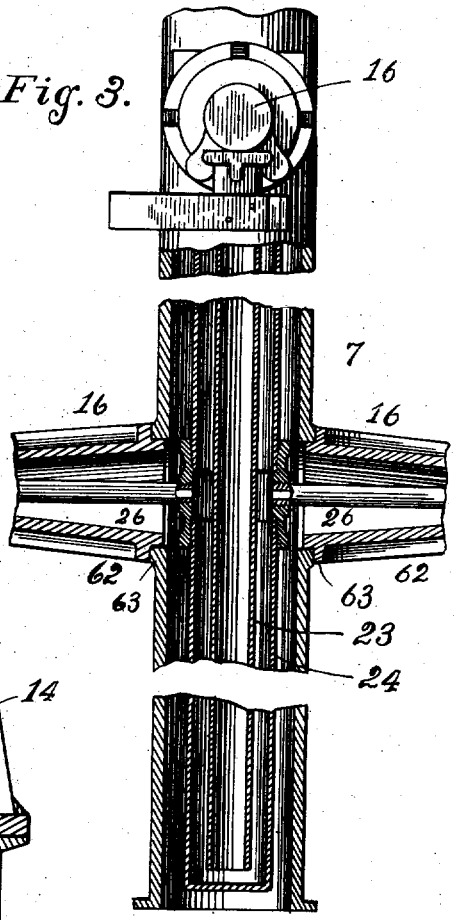
Figure 4:
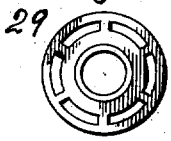

In the accompanying drawings, Figure 1 is a central vertical section of the apparatus. Fig. 2 is a vertical section, on a larger scale, of the upper portion of the hollow driving shaft or column and the water-pipe connections. Fig. 3 is a similar view of the lower portion thereof. Fig. 4 is a plan view of a detail. Fig. 5 is a vertical section of the lower end of the hollow shaft and an arm extending therefrom, broken, partly in section, and partly in side elevation. Fig. 6 is a plan view from below of one of the arms with the rabble-holding sections in position therein, but without the rabbles. Fig. 7 is a similar view, enlarged, but showing one rabble in position in the holder; and Fig. 8 is an enlarged transverse section of an arm with a rabble-holder and rabble therein.

Referring to the drawings, 1 represents the circular wall of a McDougall roasting-furnace having the brick arches or floors 2, the ore-feeders 3, and stack 4 of the usual construction. Upon a pier 5 of masonry is stepped, as shown at 6, a central vertical shaft 7, carrying a bevel-gear 8, driven through a pinion 9 from any suitable source of power. Said shaft 7 extends through central apertures in the floors 2 of the furnace, of which apertures alternate ones, as 10, are closed around the shaft, whereas the other apertures 12 are of greater diameter and form passages through the floors for the descending ore and ascending currents of air. Passages through the other floors are formed at the circumference, as shown at 13. The shaft 7 is revolubly supported at its upper end in a bearing 14, suitably mounted on I-beams 15 at the top of the furnace. From said shaft 7 extend arms 16, there being two such arms immediately over each floor in opposite directions from the shaft, arms over alternate floors being arranged at right angles with each other. To the under side of each arm are secured a number of rabbles 17, set obliquely to the arm, the function of such rabbles being to stir the ore and gradually work it either toward the center or toward the circumference of the furnace, according to the inward or outward inclination of the rabble. Thus the ore after being fed through the ore-traps in the topmost arch (indicated at 18 by dotted lines) is alternately moved outward and inward along successive floors and undergoes continued exposure to currents of air ascending in the reverse direction, being finally discharged through the pocket 19.

All of the above construction is well known and forms no part of my invention, which I will now proceed to describe.

In my invention the shaft 7 is made hollow and is connected above the bearing 14 by means of a stuffing-box 20 to a headpiece 21, suitably packed in said stuffing-box, as shown at 71, which headpiece does not rotate, but is held by stays 22, mounted on the I-beams 15. From the top of the headpiece 21 extends centrally downward a feed-water pipe 23, into which water is supplied from any suitable source, said pipe being of such length as to approach within a short distance of the bottom of the hollow shaft 7. The water discharging from the open bottom of the pipe 23 escapes into the bottom of a pipe 24 of larger diameter than and surrounding said pipe 23 and closed at the bottom, so that the water now flows upwardly in said pipe 24. Into said pipe 24 are screwed, as shown at 25, small branch pipes 26, extending horizontally from the pipe 24 into the arms 16, which in my invention are made of piping closed at the end by removable caps 28 to permit of inspection of the interior of the arms 16 and of the branch pipe 26 therein, the outer ends of said branch pipes being supported in said arms 16 by spiders 66. The water flowing upwardly in the pipes 24 passes radially outward in the pipes 26, escapes from the open ends of said pipes into the arms 16, returning in said arms on the outside of the branch pipes into the hollow shaft 7 outside the pipe 24, and continues to ascend in the shaft 7. A spider 29 is mounted between the pipe 23 and the stuffing-box 20, and said spider serves to hold the top of the pipe 24 and close the annular space formed by the pipe 24 around the pipe 23. Through this spider the water passes from the hollow shaft 7, around the pipe 24, into the interior of the stuffing-box 20, thence through the headpiece 21, and out by an exhaust-pipe 30. By this means the arms of the stirrer are sufficiently cooled to withstand the action of the intense heat of the furnace.

The rabbles for stirring the ore are in my invention attached to the arms 16 in the following manner: Upon each arm 16 a number of clamps 35 are secured by means of set-screws 36, so as to extend downward from the arms, the lower portion of said clamps being bent around to form claws 37, adapted to engage the sides of a rabble-holder 38. Said holder comprises a bar 39, which is adapted to slide within the claws 37 of a series of clamps 35, secured on one of the arms 16 and having ribs 40 projecting from the bar in a plane at right angles to the plane of the bar, but obliquely to its general direction, as shown in Figs. 6 and 7. To these ribs 40 are bolted, as shown at 41, the rabbles 42, which are oblong metal plates. The rabble-holder may, if desired, be formed in sections 69, which are inserted one behind the other between the claws of the series of clamps on any arm. It will readily be seen that with this construction the rabbles and their holder can be readily removed from the arms 16 and replaced thereon for the purpose of inspection, repairs, or renewal. In the same manner the attachment of the hollow arms 16 to the central shaft 7 is such as to facilitate removal and replacement, said arms being threaded near their inner end, as shown at 60, and screwed into flanged collars 61, secured on flanged sleeves 62, said sleeves being mounted, as shown, on apertured bosses 63, cast on the side of the central hollow column or shaft 7. The extreme inner end of the arm 16 is turned to fit snugly within said sleeve 62 to better support the arm. Doors 70 are provided in the wall of the furnace, through which the arms and the branch pipes therein and the rabble-holders supported thereupon can be withdrawn.

In my invention also the central openings for the shaft of those floors which discharge peripherally are made sufficiently large to permit said shaft to be hoisted out without the necessity of pulling out any of the brickwork and are closed by removable plates 11.

I claim—

1. In a roasting-furnace, the combination, with a series of floors, of a central hollow shaft, hollow arms carried thereon over the respective floors, an open-bottomed pipe inserted in said shaft, an intermediate pipe in said shaft into which the first pipe discharges, open-ended pipes leading from the intermediate pipe into the hollow arms, and feed and exhaust pipes connected to the first pipe and hollow shaft, substantially as described.

2. In a roasting-furnace, the combination, with a series of floors, of a central hollow shaft, hollow arms carried thereon over the respective floors, an open-bottomed pipe inserted in said shaft, an intermediate pipe in said shaft into which the first pipe discharges, a spider between the first pipe and the shaft, supporting, and closing the top of, the intermediate pipe, open-ended pipes leading from the intermediate pipe into the hollow arms, and feed and exhaust pipes connected to the first pipe and the hollow shaft, substantially as described.

3. In a roasting-furnace, the combination, with a series of floors, of a central hollow shaft, hollow arms carried thereon over the respective floors, an open-bottomed pipe inserted in said shaft, an intermediate pipe in said shaft into which the first pipe discharges, open-ended pipes leading from the intermediate pipe into the hollow arms, spiders within the arms around the open ends of said pipes, and feed and exhaust pipes connected to the first pipe and hollow shaft, substantially as described.

4. In a roasting-furnace, the combination, with a series of floors, of a central hollow shaft, hollow arms carried thereon over the respective floors, an open-bottomed pipe inserted in said shaft, an intermediate pipe in said shaft into which the first pipe discharges at the bottom, open-ended pipes leading from the intermediate pipe into the hollow arms, and feed and exhaust pipes connected to the first pipe and hollow shaft, substantially as described.

5. In a roasting-furnace, the combination, with a series of floors, of a central hollow shaft, hollow arms carried thereon over the respective floors, an open-bottomed pipe inserted in said shaft, an intermediate pipe in said shaft into which the first pipe discharges at the bottom, a spider between the first pipe and the shaft, supporting, and closing the top of, the intermediate pipe, open-ended pipes leading from the intermediate pipe into the hollow arms, and feed and exhaust pipes connected to the first pipe and the hollow shaft, substantially as described.

6. In a roasting-furnace, the combination, with a series of floors, of a central hollow shaft, hollow arms carried thereon over the respective floors, an open-bottomed pipe inserted in said shaft, an intermediate pipe in said shaft into which the first pipe discharges at the bottom, open-ended pipes leading from the intermediate pipe into the hollow arms, spiders within the arms around the open ends of said pipes, and feed and exhaust pipes connected to the first pipe and hollow shaft, substantially as described.

7. In a roasting-furnace, the combination, with a series of floors, of a central hollow shaft, hollow arms carried thereon over the respective floors, an open-bottomed pipe inserted in said shaft, an intermediate closed-bottomed pipe in said shaft into which the first pipe discharges at the bottom, open-ended pipes leading from the intermediate pipe into the hollow arms, and feed and exhaust pipes connected to the first pipe and hollow shaft, substantially as described.

8. In a roasting-furnace, the combination, with a series of floors, of a central hollow shaft, hollow arms carried thereon over the respective floors, an open-bottomed pipe inserted in said shaft, an intermediate closed-bottomed pipe in said shaft into which the first pipe discharges at the bottom, a spider between the first pipe and the shaft, supporting, and closing the top of, the intermediate pipe, open-ended pipes leading from the intermediate pipe into the hollow arms, and feed and exhaust pipes connected to the first pipe and the hollow shaft, substantially as described.

9. In a roasting-furnace, the combination, with a series of floors, of a central hollow shaft, hollow arms carried thereon over the respective floors, an open-bottomed pipe inserted in said shaft, an intermediate closed-bottomed pipe in said shaft into which the first pipe discharges at the bottom, open-ended pipes leading from the intermediate pipe into the hollow arms, spiders within the arms around the open ends of said pipes, and feed and exhaust pipes connected to the first pipe and hollow shaft, substantially as described.

10. In a roasting-furnace, the combination, with a series of floors, of a central hollow shaft, sleeves secured to the shaft, hollow arms having their ends inserted in said sleeves, and threaded outside said sleeves, threaded collars on said threaded portions and secured to said sleeves, and a feed-pipe for supplying water to said hollow shaft and arms, substantially as described.

11. In a roasting-furnace, the combination of a rabble-arm, clamps removably secured at intervals therealong, said clamps carrying guides in line with each other parallel to said arm, a rabble-holder slidably held in said guides, and rabbles secured to said holder, substantially as described.

12. In a roasting-furnace, the combination of a rabble-arm, clamps removably secured thereon, rabble-holder sections held in said clamps and longitudinally removable therefrom, said sections having downwardly-extending ribs, and rabbles removably secured to said ribs, substantially as described.

In witness whereof I have hereunto set my hand in the presence of two subscribing witnesses.

LEWIS T. WRIGHT.

Witnesses:
WM. HEAD,
F. O. HURT.